US008714426B2

(12) United States Patent
Bohurjak et al.

(10) Patent No.: US 8,714,426 B2
(45) Date of Patent: May 6, 2014

(54) TRIPOD AND TRANSPORT PACK ASSEMBLY

(75) Inventors: Michael Allen Bohurjak, Medina, OH (US); Darrell Keith Vandegrift, Wooster, OH (US); Allen Michael McAfoos, Wooster, OH (US)

(73) Assignee: The Will-Burt Company, Orrville, OH (US)

( * ) Notice: Subject to any disclaimer, the term of this patent is extended or adjusted under 35 U.S.C. 154(b) by 562 days.

(21) Appl. No.: 12/884,918

(22) Filed: Sep. 17, 2010

(65) Prior Publication Data
US 2012/0067752 A1 Mar. 22, 2012

(51) Int. Cl.
*A45F 3/04* (2006.01)
(52) U.S. Cl.
USPC ........... 224/652; 224/576; 224/153; 224/637; 224/651; 224/655
(58) Field of Classification Search
USPC ................. 224/257, 576, 637, 628, 631, 645, 224/650–655, 262, 585, 908
See application file for complete search history.

(56) References Cited

U.S. PATENT DOCUMENTS

| | | | |
|---|---|---|---|
| 3,783,262 A | 1/1974 | Pile | |
| 4,884,731 A * | 12/1989 | Sibley | 224/651 |
| 5,218,375 A | 6/1993 | Hillman | |
| 5,233,809 A | 8/1993 | Gropper | |
| 5,975,393 A | 11/1999 | Bellamy | |
| 6,216,296 B1 * | 4/2001 | Carrasco | 5/625 |
| 6,547,110 B2 | 4/2003 | O'Hare | |
| 6,619,519 B1 | 9/2003 | Nix et al. | |
| 6,637,633 B1 * | 10/2003 | Eberle | 224/582 |
| D545,057 S | 6/2007 | Cyr | |
| 7,959,048 B1 * | 6/2011 | Cyr | 224/651 |
| 8,118,201 B1 * | 2/2012 | Calkin | 224/156 |
| 2002/0092882 A1 * | 7/2002 | Jones | 224/645 |
| 2006/0261207 A1 | 11/2006 | Woodruff et al. | |
| 2007/0145089 A1 * | 6/2007 | Robert | 224/637 |
| 2009/0267865 A1 * | 10/2009 | Miller et al. | 343/901 |

FOREIGN PATENT DOCUMENTS

WO  WO 2009/090393  7/2009

OTHER PUBLICATIONS www.worldwidedx.com/general-ham-radio-discussion/34050-2009-dayton-hamvention-coverage-3.html#post141567, Hamvention, May 17, 2009.
www.bwantennas.com, Barker & Williamson, Oct. 23, 2007.
www.clarkmast-usa.com/DAFseries.com, Clark Mast DAF, Jun. 6, 2002.
www.aerialphotographymast.com, Aerial Photography Mast, May 19, 2008.

* cited by examiner

*Primary Examiner* — Justin M Larson
*Assistant Examiner* — Corey Skurdal
(74) *Attorney, Agent, or Firm* — Fay Sharpe LLP

(57) ABSTRACT

A portable tripod mast assembly is provided that includes a tripod, a plurality of mast sections and a transport pack. The tripod includes at least three telescoping legs, wherein each leg is moveably attached to a common upper collar. The plurality of mast sections are each adapted to fit together end to end, forming a mast. The transport pack has a center compartment adapted to receive the tripod, wherein the center compartment includes a center panel and two side panels. Each side panel includes a plurality of individual pockets for receiving the mast sections. The transport pack further includes a base portion and a hood capable of extending over the mast sections, securing the sections in the pockets.

17 Claims, 21 Drawing Sheets

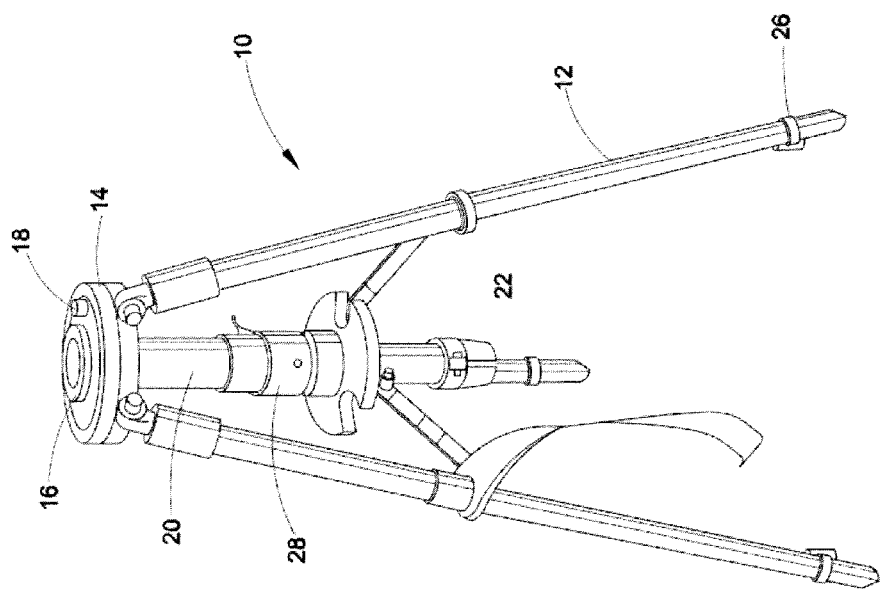

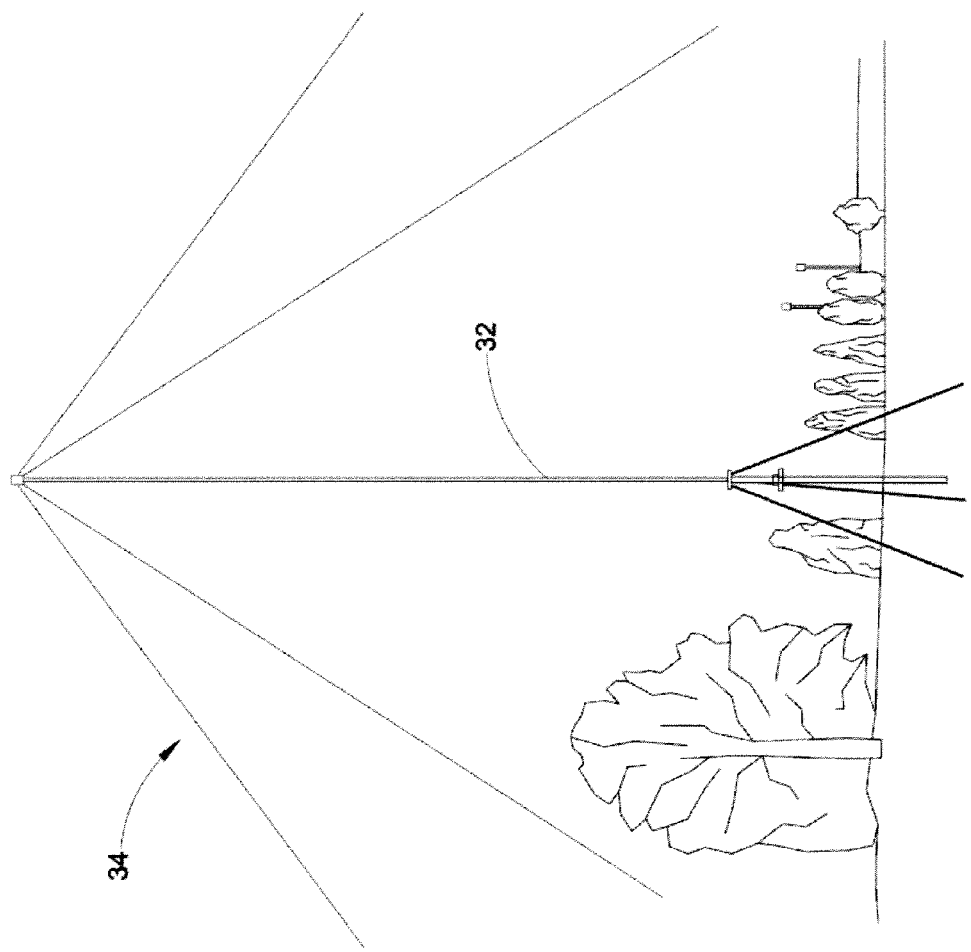

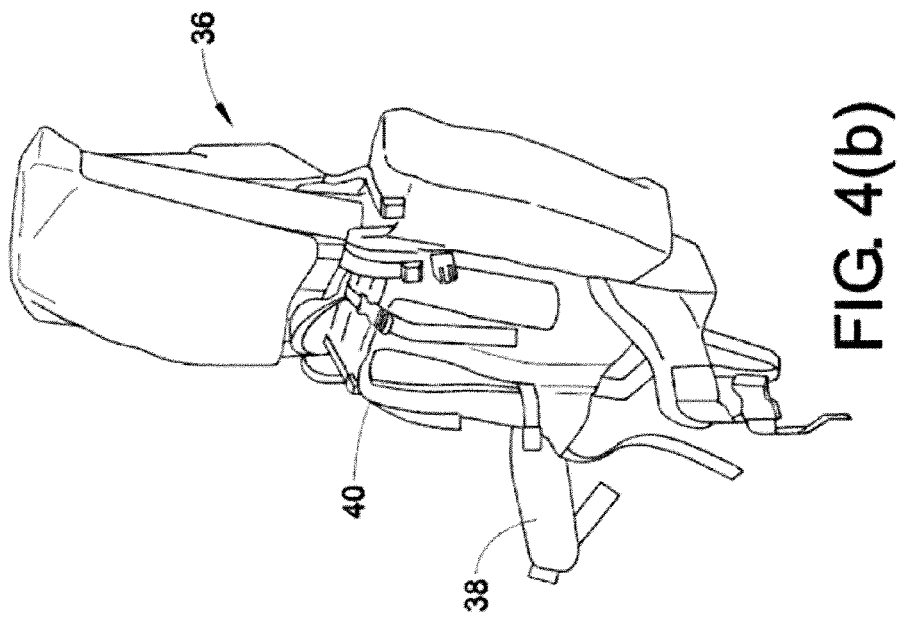
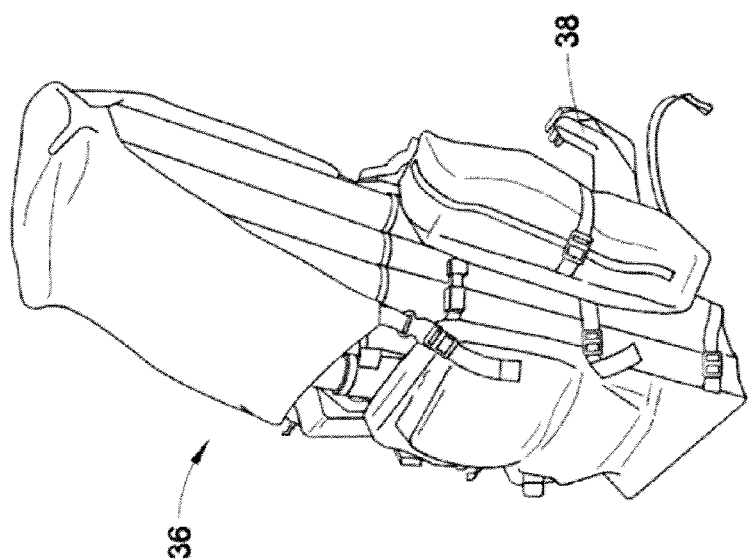
FIG. 4(b)
FIG. 4(a)

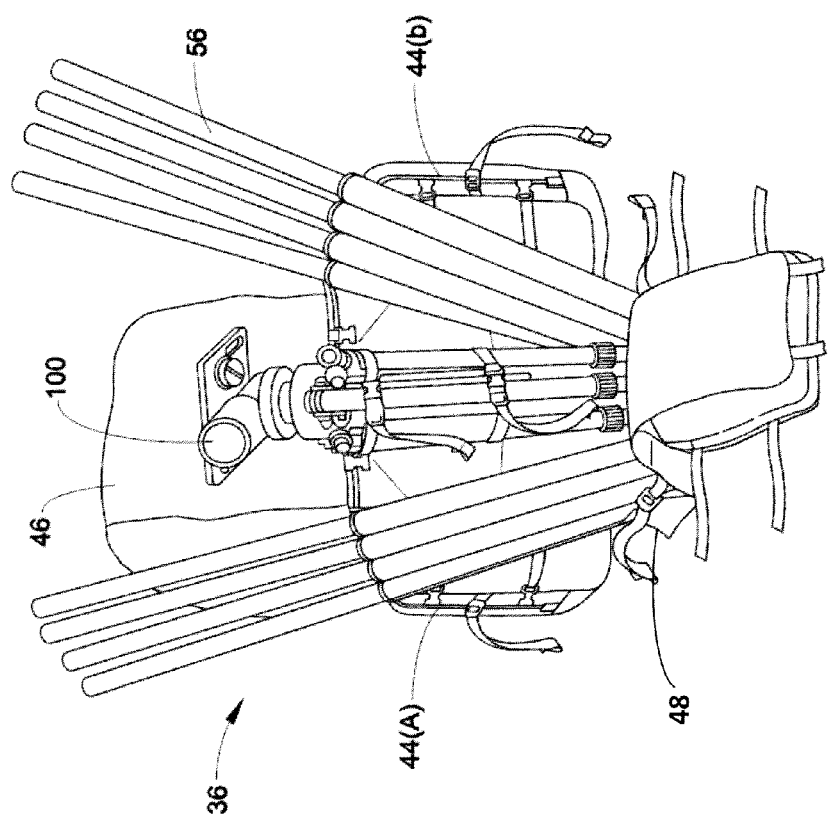

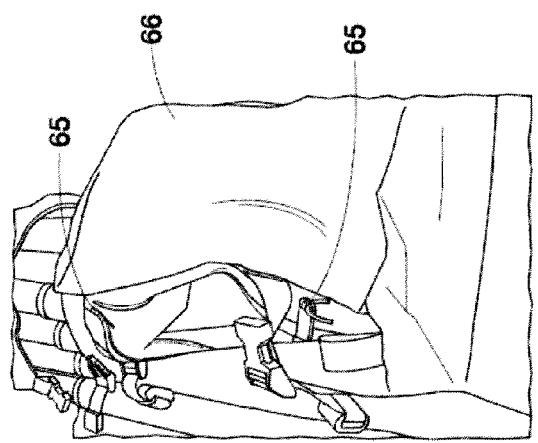
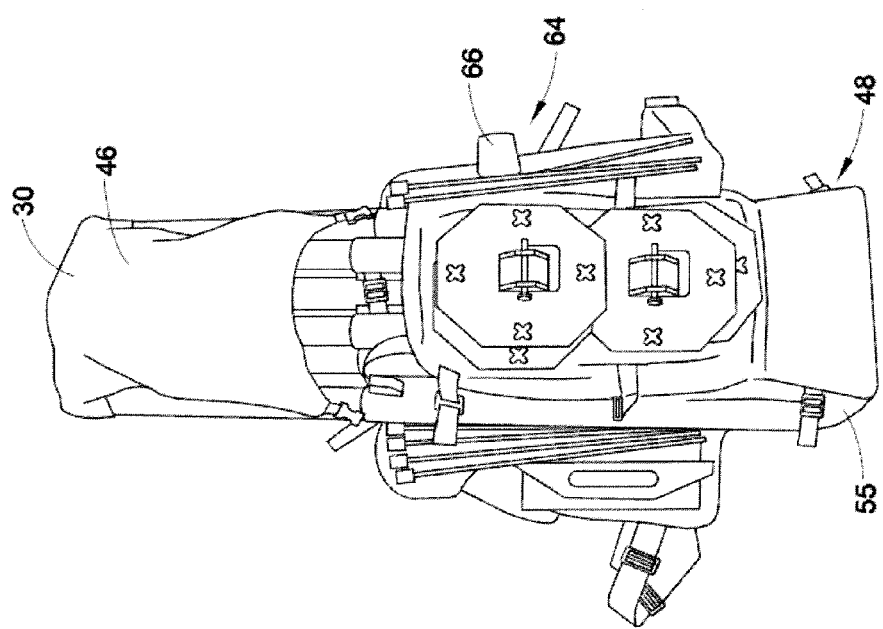
FIG. 11(b)
FIG. 11(a)

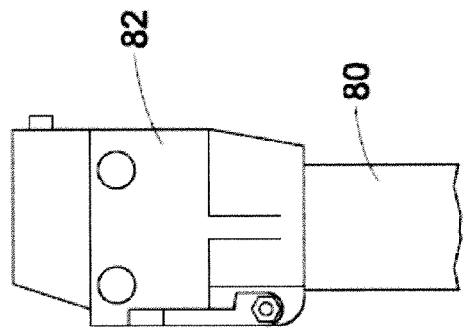
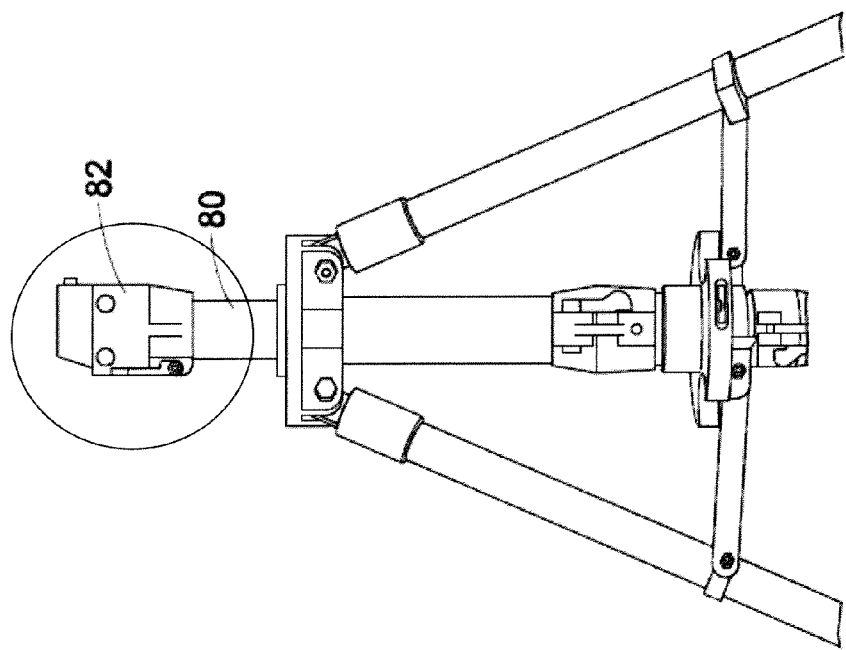

TRIPOD AND TRANSPORT PACK ASSEMBLY

BACKGROUND

The present invention relates generally to a portable tripod mast system. It finds particular application in conjunction with a lightweight tripod mast system and a custom designed transport pack, and will be described with particular reference thereto.

BRIEF DESCRIPTION

Telescoping masts comprise a number of hollow, cylindrical, coaxial sections that are often erected by hoisting one section off the ground, fastening the bottom of the first section to the top of the second section, and repeating this process until the top of the mast is a desired height. A tripod base is generally provided to provide support and stability to telescoping masts.

Many different types of portable antenna mast assemblies are used in various fields that require the assembly be able to be transported and erected in a short time, and also disassembled and packed for transport to a different location. Quick erecting telescoping masts are used for many applications including civilian, industrial and military applications throughout the world. Quick erecting telescoping masts are particularly suited for applications wherever there is a need for portable masts requiring fast setup and teardowns with minimum power and effort. In addition to numerous military applications, including target acquisition, surveillance and field communications, quick erecting telescoping masts are utilized commercially to support a wide variety of antennas, elevated testing equipment, floodlights and cameras. Free-standing masts can be installed on a wide variety of vehicles and shelters.

WO 2009/0903393 discloses a prior art mast assembly, wherein a readily erectable and transportable mast comprising a pneumatically inflatable elongate tube that is coupled to a ground support tripod. The mast structure is collapsible for packing away into a shoulder bag for transport. Another mast system, produced by Hamvention, includes a carbon fiber portable antenna mast system, which further includes a tripod, mast, stand-offs to mount the antenna, guy ropes, anchors, and a block and tackle system, that is also capable of breaking down in a bag for transport.

However, none of the known tripod/mast systems provides a pack that is custom designed to assist in quick and easy deployment and portability. Accordingly, there remains a need for a lightweight tripod mast system that is easily deployed and retracted, and fits snuggly in a custom-designed pack to improve transportability of the tripod mast system.

SUMMARY OF THE INVENTION

In accordance with one aspect of the subject application, a portable tripod mast assembly is provided. The portable tripod mast assembly includes a tripod, having at least three telescoping legs, such that each leg is moveably attached to a common upper collar, and a plurality of mast sections, that are adapted to fit together end to end, forming a mast. The tripod mast assembly further includes a transport pack having a center compartment adapted to receive the tripod, the center compartment comprising a center panel and two side panels, wherein each side panel includes a plurality of individual pockets for receiving the mast sections. The transport pack further includes a base portion and a hood capable of extending over the mast sections, securing the sections in the pockets.

In accordance with another aspect of the present application, a method for transporting a tripod and mast assembly is provided. The method includes providing a transport pack having a base portion, a hood, and a center compartment consisting of a center panel and two side panels, each side panel comprising a plurality of individual pockets, positioning a tripod in the center compartment and securing the tripod with at least one snap-clip; inserting a plurality of mast tube sections into the plurality of individual pockets in the side panels, and closing the side panels over the center panel, such that the side panels enclose the tripod. The method further includes extending the hood over the mast tube sections, unfolding the base portion into a bottom panel and a front panel, wherein the front panel extends over the side panels; and securing the hood to the front panel.

In accordance with yet another aspect of the present invention, a transport pack is provided that comprises a foldable base portion, including a hard bottom panel and a front panel connected thereto and a center compartment having a center panel and two side panels. Each side panel consists of a plurality of individual vertical pockets for receiving individual tube sections of a mast. The center compartment is adapted to receive a tripod and restrain the tripod in place with at least one snap clip. The panels are adapted to be flipped up against the tripod to further secure the tripod in place. The transport pack further includes a hood that is adapted to be pulled down over the tube sections and secured to the center panel; and one or more side pockets for holding accessories.

In accordance with a further aspect of the present invention, a kit comprising a tripod mast assembly and transport pack is provided. The kit includes a tripod, a plurality of mast sections; and a plurality of tripod mast accessories, including one or more of guy lines; a guy stake measuring rope; steel guy stakes; hammer; an ergonomic mast section lifter, and a payload adaptor; and a transport pack, wherein the tripod, the plurality of mast sections, and the accessories are securely packed in the transport pack.

BRIEF DESCRIPTION OF THE DRAWINGS

The invention will be better understood and objects other than those set forth above will become apparent when consideration is given to the following detailed description thereof. Such description makes reference to the accompanying drawings.

FIG. 1 is a perspective view of the tripod in a fully extended position in accordance with a preferred embodiment of the present invention;

FIG. 3 is a side view of a tripod mast assembly in a fully extended position;

FIG. 4(a) is a front angled view of a fully packed transport pack in accordance with a preferred embodiment of the present invention;

FIG. 4(b) is a rear angled view of a fully packed transport pack in accordance with a preferred embodiment of the present invention;

FIG. 10 is a schematic view of the transport pack including a tripod packed therein, and further including a payload;

FIG. 11(a) is a front view of the fully packed transport pack, with base plates attached to the front panel;

FIG. 11(b) is a close-up view of the main pocket located on the front panel;

FIGS. 17(a) and (b) shows the guy collar/top section adaptor according to one aspect of the subject invention;

DETAILED DESCRIPTION

Figure 2B:
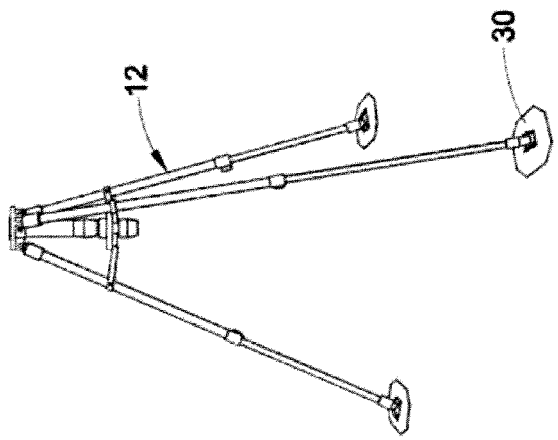
FIG. 2(b) is a side elevational view of the tripod in the extended position with base plates attached to the base of each leg.
Figure 2C:
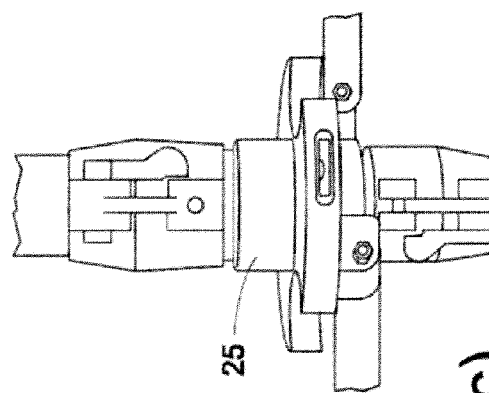
FIG. 2(c) is a front view of a tripod's bubble level(s)
Figure 2A:
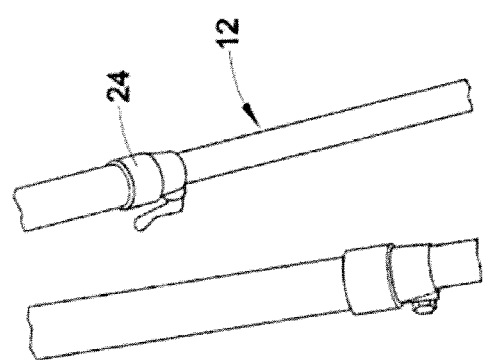
FIG. 2(a) is a side view of the locking mechanism located on the legs of the tripod.

With reference to FIG. 1, a tripod 10 is provided that comprises three, or optionally four or more telescoping legs 12. The tripod is MIL-STD-810 qualified, built with a lightweight, high strength material, such as glass-fiber composite material and aluminum casings. The base of each leg 12 includes a leg clamp 26, which allows the increase of clamping power without damaging the tripod legs 12. As illustrated in FIG. 2(a), telescoped legs 12 are locked in the extended position with friction locks 24, which enable fast extension of the legs 12 without over tensioning. As further illustrated in FIG. 2(b), the bottom end of each tripod leg 12 is configured to mate with a corresponding base plate 30. The tripod legs 12 are inserted into the base plates 30 and can be attached using a hitch pin that is attached to the base plate 30.

According to the exemplary tripod depicted herein, three telescoping legs 12 are provided that each connects to an upper collar 14. The legs 12 may attach to the upper collar in a rigid or hinge-like manner; however, it is to be appreciated that numerous commonly-known mechanical connections between each leg 2 and the upper collar are possible and contemplated herein. The upper collar preferably includes a raised boss 16 that eliminates cable management obstructions with the top of the tripod 10 and the base of the upper collar. The upper collar additionally includes an anti-rotation boss 18 that limits the rotation of the upper collar when deploying the tripod 10. Additionally, extending downwardly from the upper collar is a center tube 20. The center tube 20 provides extra stabilization when deploying mast sections and provides additional overall strengthening to the tripod 10. Located in the mid section of the center tube 20 is an upper collar clamp 28. The upper collar clamp 28 provides locking of the mast sections to increase stabilization of the tripod 10 for heavy payload deployments on the mast (not illustrated). The bottom portion of the center tube 20 includes a mast tube clamp 22 that is implemented to increase the clamp power on the mast sections without damaging the carbon fiber sections themselves. Further, center tube 20 includes two bubble levels, allowing the tripod to be plumb on up to about a 5° slope. (FIG. 2(c)).

As illustrated in FIG. 3, the tripod further includes a mast 32 designed to support a variety of payloads, including cameras and antennas. The mast is comprised of multiple sections made from a high strength carbon fiber. Each mast section is preferably keyed to prevent individual sections from rotating. The tripod and mast together form a tripod mast assembly 34. The transport (fold-up) size of the tripod mast assembly can vary according to particular use requirements. In one exemplary embodiment, the tripod assembly comprises a diameter of about 8 inches and a length of about 54 inches. When deployed, the tripod assembly may comprise a height of about 89.5 inches by diameter space of about 80.5 inches. The tripod mast assembly 34 preferably includes a wide base that enables quick assembly and deployment by a one or two man team extending mast sections to any desired height, for example, from about 9 feet to about 60 feet. It is preferred that the one or two man team can lift payloads up to, and possibly exceeding 80 lbs.

As illustrated in FIGS. 4(a) and (b), a portable, lightweight transport pack 36 is provided to transport the tripod mast assembly 34 easily and efficiently. Each component of the tripod mast assembly 34 can be packed into the transport pack 36 and carried by a single person. The transport pack 36 further includes compartments for carrying accessories and the like. The pack is preferably made from durable nylon fabric, similar to military equipment; although other durable, all-weather fabric is also contemplated herein. The transport pack 36 is ergonomically balanced and double stitched for increased strength. As shown in FIG. 4(b), the transport pack includes padded shoulder straps 40 to facilitate carrying the transport pack as a backpack, and also padded waist straps 38 to help reduce the weight of the load on the carrier's back and shoulders. The padded waist straps snap together around a carrier's waist by a snap clip. Each of the shoulder straps and the waist straps are preferably adjustable using clinch straps to fit the particular size and build of the carrier.

Figure 6:
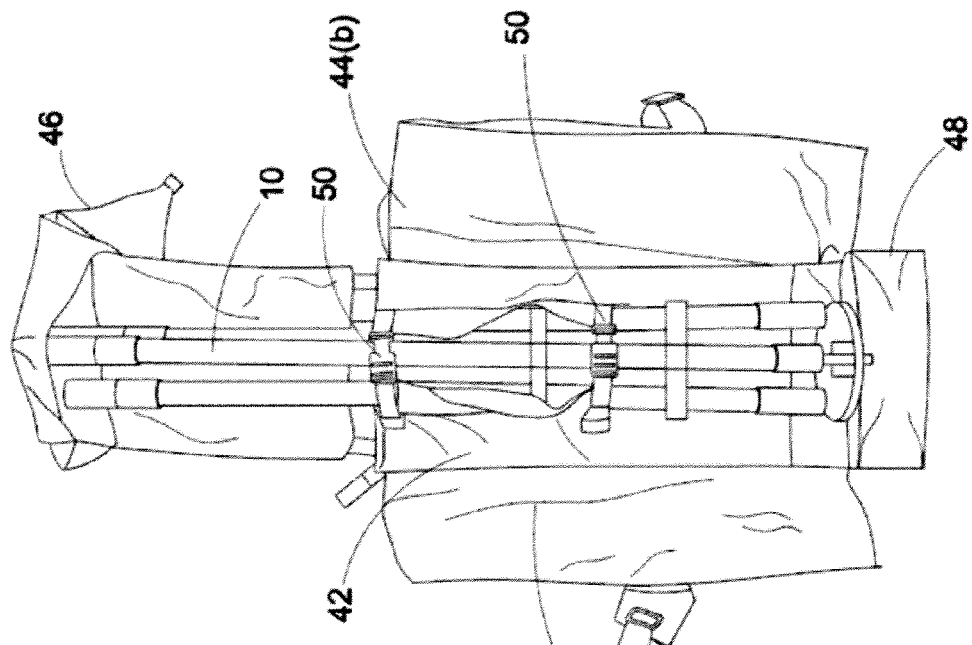
FIG. 6 is a front view of the transport pack including the tripod in the center vertical compartment.
Figure 5:
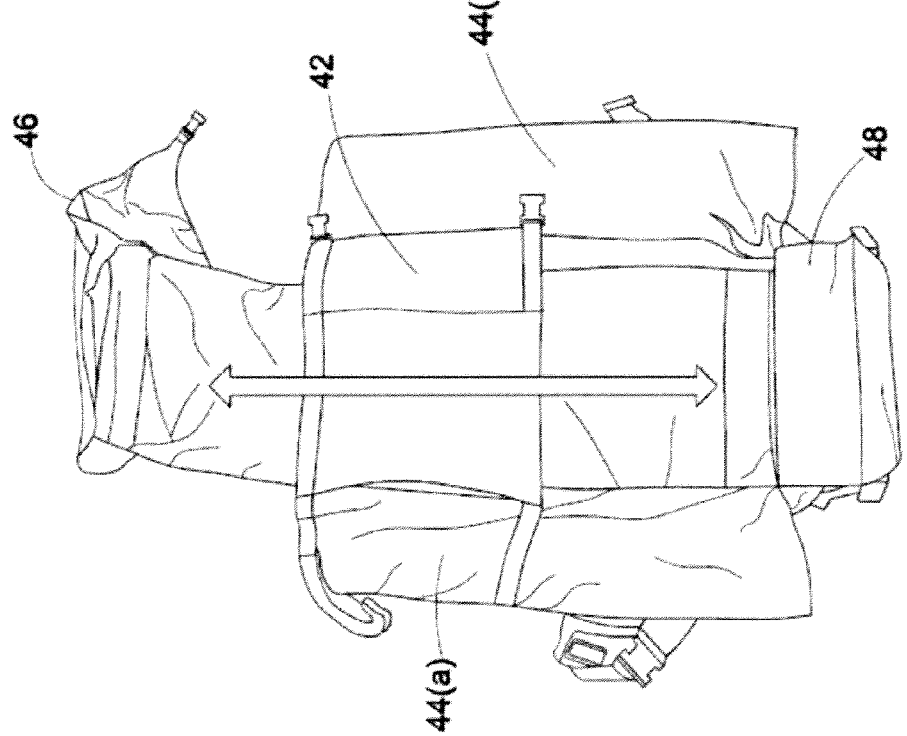
FIG. 5 is front view of the transport pack with an empty center compartment.

FIG. 5 depicts an exemplary embodiment of the transport pack 36, which comprises a center panel 42, two side panels 44(a),(b) on each side of the center panel 42, a hood 46, and a base portion 48. Each aspect of the transport pack is preferably padded to provide protection from outside contact with the transport pack 36. When the tripod 10 is in the folded position for transport, it can be placed on the center panel 42, such that the upper collar rests against the base portion 48 and the tripod legs 12 extend into the hood 46. (FIG. 6). The tripod 10 is secured in place with at least one snap clip 50, and preferably at least two snap clips 50, to restrain the tripod 10 and ensure it does not shift during transport. Each snap-clip 50 includes a clinch strap to ensure the tripod mast assembly 34 is secured tightly in the transport pack 36 to decrease payload movement. Once the tripod is secure, side panels 44(a),(b) are folded up over the secured tripod 10 and snapped together using adjustable side panel snap clips 52. The closed side panels 44(*a*),(*b*) create a padded and secure compartment for the tripod 10, to ensure its safe transport from place to place.

Figure 7:
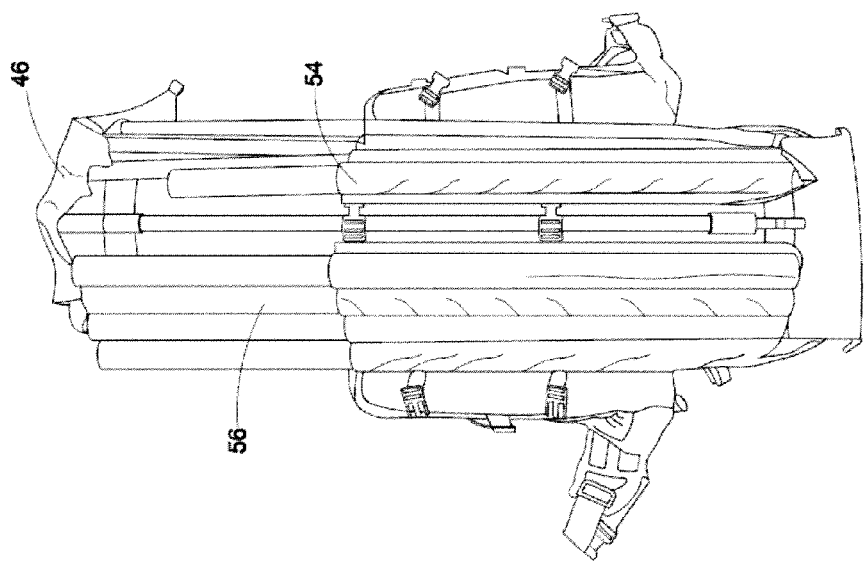
FIG. 7 is a side view of the transport pack including mast sections in the side panel pockets.
Figure 8B:
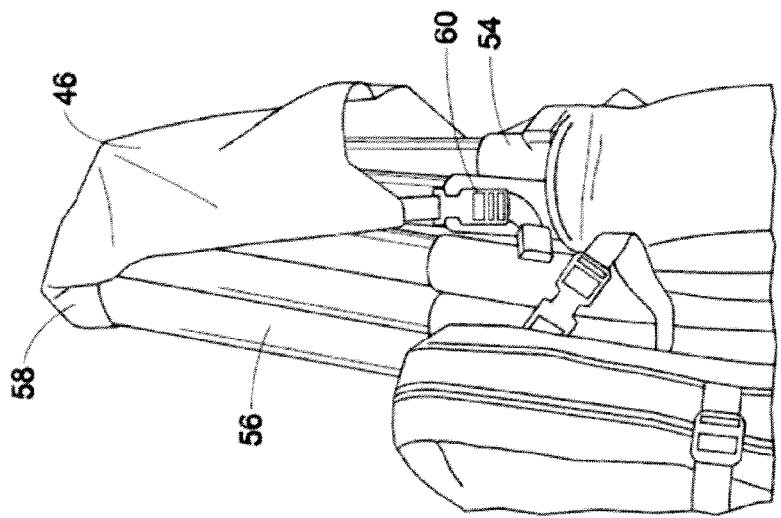
FIGS. 8(a) and (b) show the mast sections tucking into the hood of the transport pack.
Figure 8A:
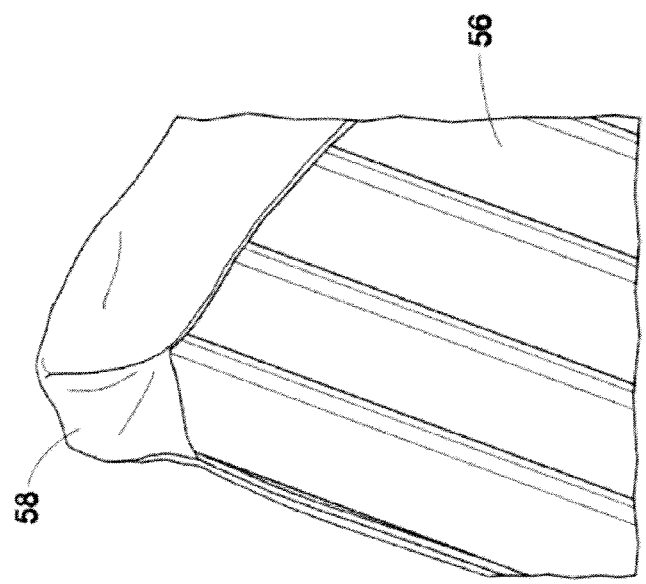

Each side panel 44(*a*),(*b*) includes individual pockets 54 that can each accept one mast section 56. FIG. 7 shows each panel including four pockets, for accommodating a mast with eight sections; however, each panel 44(*a*),(*b*) may include any number of pockets to allow for the transportation of various sized masts. The top of the hood 46 includes a pouch 58, such that portion of the mast sections 56 extending out of the pockets 54 is tucked into the pouch 58 of the pack. (FIG. 8(*a*)). The hood 46 may then be pulled down over the sections, securing the sections 56 in the pockets 54 during transport. Hood snap-clips 60 on the front of the hood secure it tightly to the transport pack and decrease payload movement. (FIG. 8(*b*)).

Figure 9:
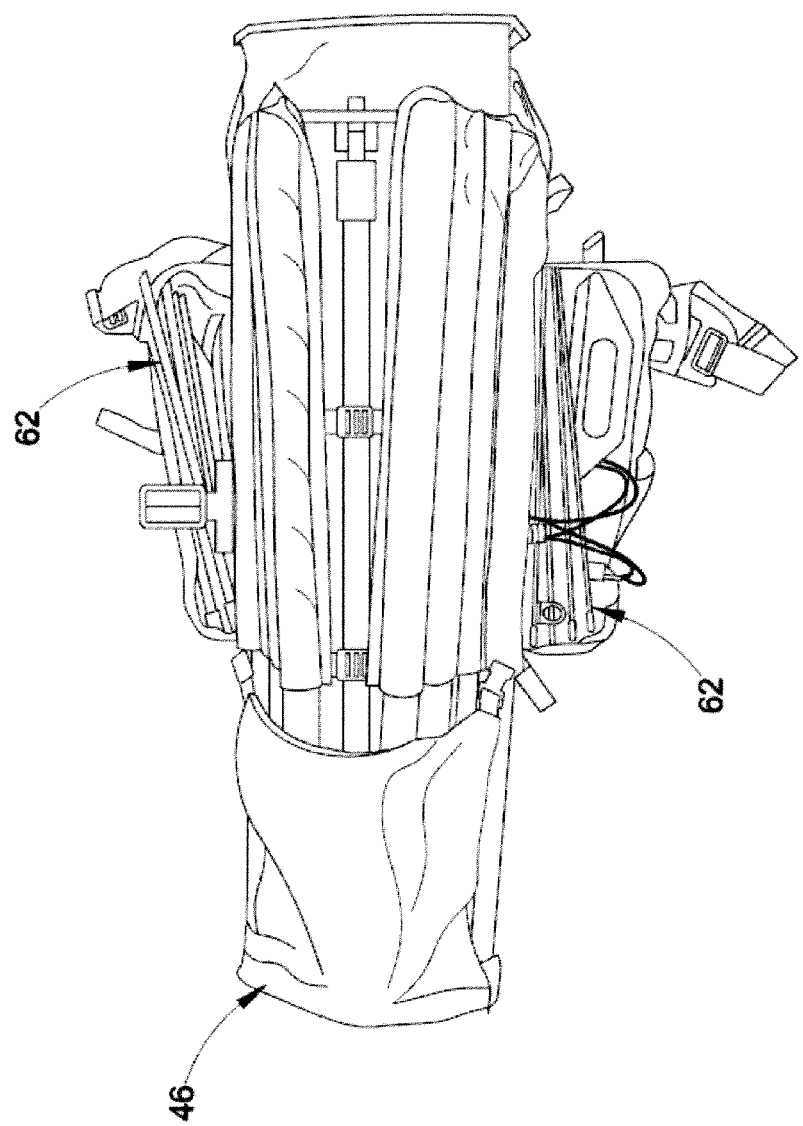
FIG. 9 is a horizontal view of a fully packed transport pack, with the hood pulled over the mast sections.

In one exemplary embodiment illustrated in FIG. 9, the transport pack 36 includes one or more side compartments 62 for holding tripod mast assembly pieces and accessories. For instance, the side compartments may hold guy stakes, a hammer, an ergonomic mast section lifter, a payload adapter, and the like. Each compartment includes a hard bottom to eliminate ripping. The transport pack 36 may include additional pouch clips to provide further customization options by a user.

According to an alternative embodiment, the tripod may be placed in the transport pack with an opposite orientation, such that the upper collar carriage is toward the top of the pack and the tripod legs extend to the base portion 48, as illustrated in FIG. 10. This arrangement allows for a payload 100 to be attached to collar and also housed within the transport pack 36. According to this particular arrangement, the side panel 44(*a*) and (*b*) still house the mast sections 56, such that closing the side panels around the payload 100 protects the payload from damage during transport.

According to one embodiment, the base portion 48 includes a bottom panel 55 and a front panel 64, wherein unfolding the base portion 48 exposes that bottom panel 55 as a hard bottom for the transport pack, and the front panel 64 may extend up over the front of the pack. Therefore, once the tripod mast assembly components are securely in place, the front panel 64 is rolled up the front of the transport pack 36, over the side panels 44(*a*),(*b*), and snaps into corresponding snap clips on the hood 46, as illustrated in FIG. 11(*a*). FIG. 11(*b*) further displays that the front panel 64 includes a main pocket 66 that may also be utilized for holding accessories or other equipment as needed. Each compartment on the transport pack preferably includes dual directional zipping 65 for ease of use and to ensure components of the main pocket remain securely in the pocket 66. Additionally, the outside of the main pocket 66 includes attachments for securing the tripod base plates 30 to the transport pack 36. As the front panel 64 is rolled up over the front of the transport pack, the bottom panel 55 creates a hard bottom to further protect the tripod mast assembly components from outside forces. The bottom panel 55 includes adjustable straps to make the bottom snug against the components inside the pack.

Figure 12B:
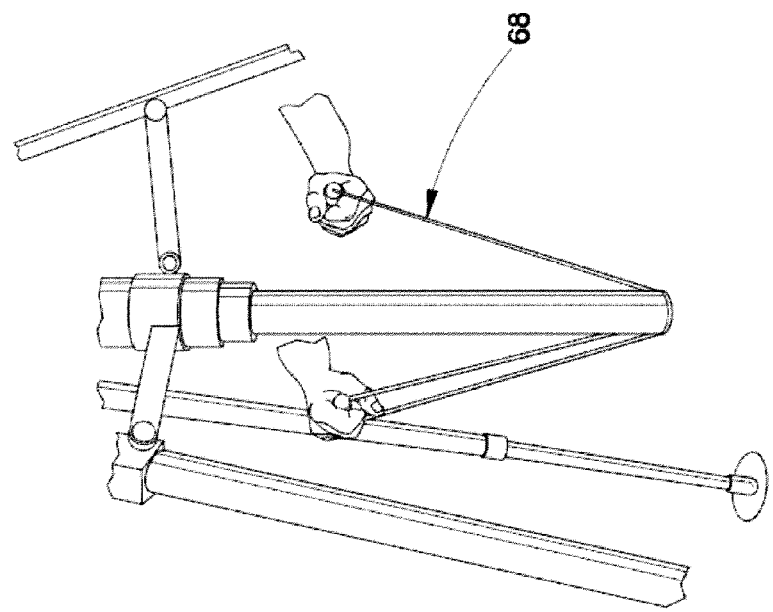
FIGS. 12(a) and (b) illustrates the ergonomic mast section lifter in accordance with one embodiment of the present invention.
Figure 12A:
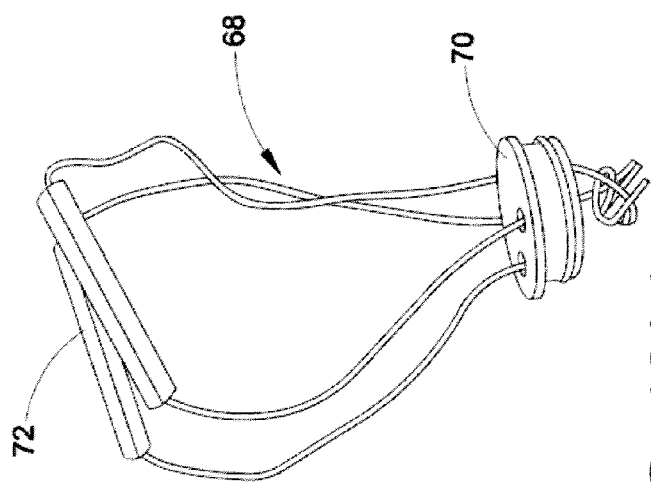
Figure 13A:
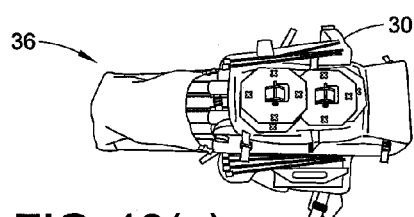
FIGS. 13(a)-(e) show a method of unpacking the transport pack according to one aspect of the subject invention.
Figure 13B:
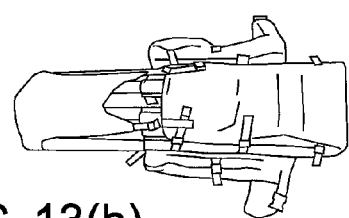
Figure 13C:
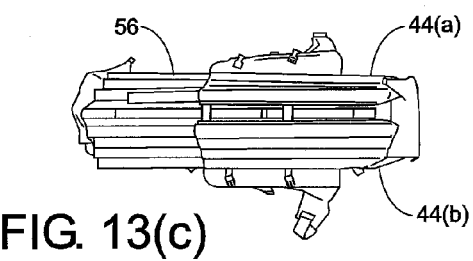
Figure 13D:
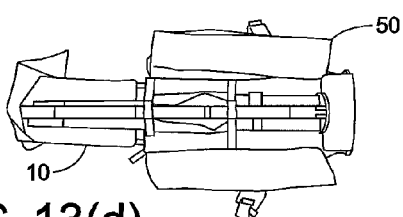
Figure 13E:
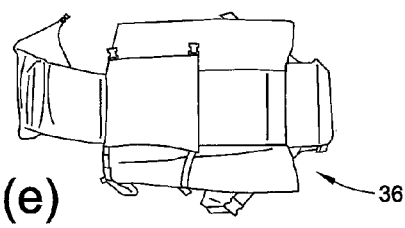

The transport pack 36 and tripod mast assembly 34 together form kit that can be packaged and sold as a unit. In one exemplary embodiment, the transport pack kit may include a tripod, a set of carbon mast sections, four guy lines, a measuring rope, eight heat treated steel guy stakes, a sledge hammer, an ergonomic tube lifter, a payload adaptor, the back pack and an instruction manual. The number of carbon mast sections in the set can vary depending on the intended use of the mast and the height desired. In one preferred embodiment, the set includes 8 carbon mast sections. The ergonomic mast section lifter 68 according to the subject application is depicted in FIGS. 12 (*a*) and (*b*). The mast section lifter 68 includes a lift puck 70 that slides into the bottom of a mast section as a breech loading safety device. The puck 70 includes an O-ring to add friction to the inside of the mast section and keep the puck from falling out of the end of the section. The section lifter 68 includes two handle grips 72 to assist in lifting the mast section mounted on the lift puck 70. The ergonomic tube lifter 68 provides a safe and easy way to elevate the payload.

The transport pack kit disclosed herein is designed to provide improved portability and quick deployment of the tripod mast assembly 34. To deploy the tripod mast assembly, the components are first removed from the transport pack 36, as illustrated in FIG. 13(*a*)-(*e*). Beginning with a fully packed transport pack 36 (FIG. 13(*a*)), the base plates 30 are removed from the front panel (FIG. 13(*b*)) and the hood 46 is unsnapped and pulled back, exposing the ends of the mast sections 56 (FIG. 13(*c*)). The side panels 44(*a*) and (*b*) are then unsnapped and opened to the sides, exposing the tripod 10. The mast sections 56 are then removed from the individual pockets 54 and set aside (FIG. 13(*d*)). Finally, the snap clips 50 holding the tripod in place are unsnapped and the tripod is removed from the transport pack 36, leaving an essentially empty pack (FIG. 13(*e*)). Any accessories included in the transport pack 36 may remain inside their respective compartments until such accessories are needed.

Figure 14:
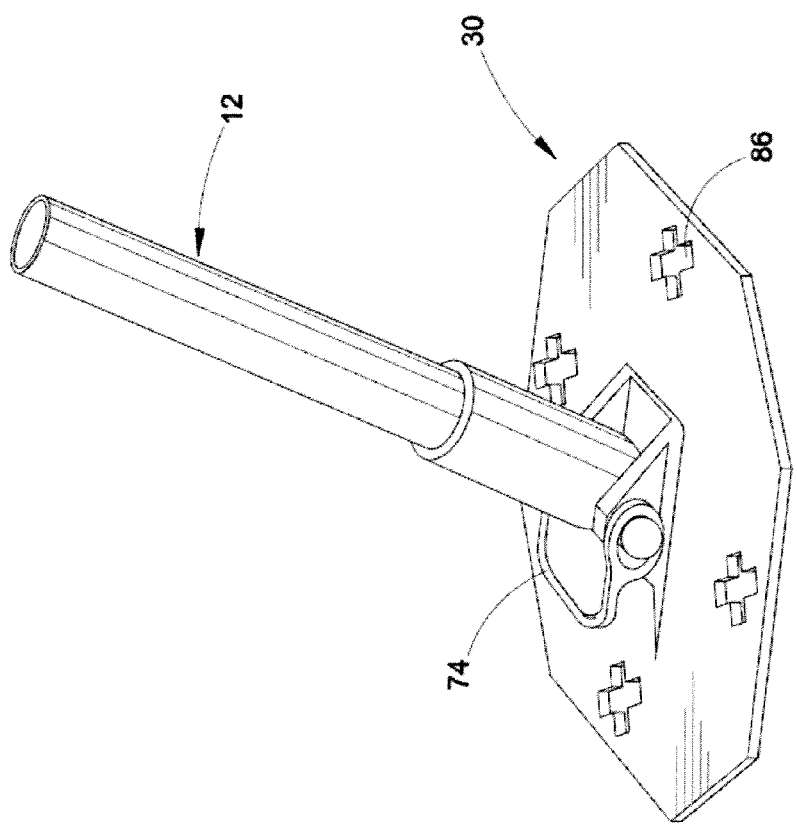
FIG. 14 is a detailed view of the base plates seen in FIG. 2(b)
Figure 15C:
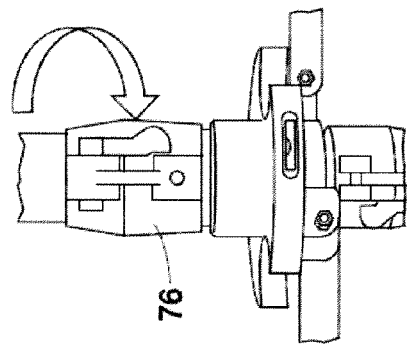
FIGS. 15(a)-(c) show the method of setting the tripod legs.
Figure 15B:
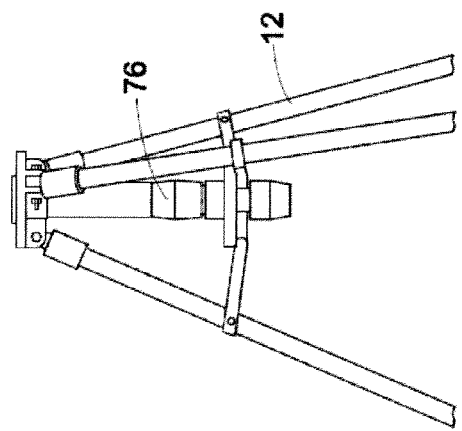
Figure 15A:
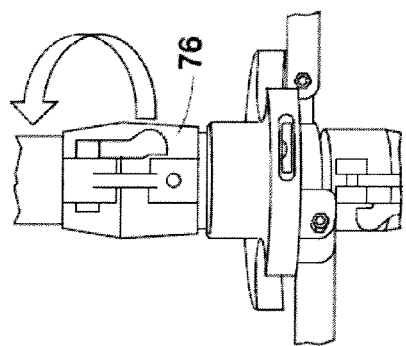

To assemble the tripod 10, the base plates 30 are attached to the bottom of each nested tripod leg 12 using a hitch pin 74 attached to the base plate, as shown in FIG. 14. A lock located on the lower collar 76 of the tripod 10 is released by moving the lock from the down position to the up position, illustrated in FIG. 15(*a*). Next, the tripod is opened by spreading apart the legs 12 (FIG. 15(*b*)) to provide a broad base, while also ensuring that the base plates 30 are essentially flat on the ground to ensure the tripod is stable (FIG. 14). The lower collar 76 should be fully depressed in a downward position. To lock the lower collar 76 in place, the lock is then moved from the up position to the down position, which locks the tripod legs in place, as shown in FIG. 15(*c*).

Figure 16A:
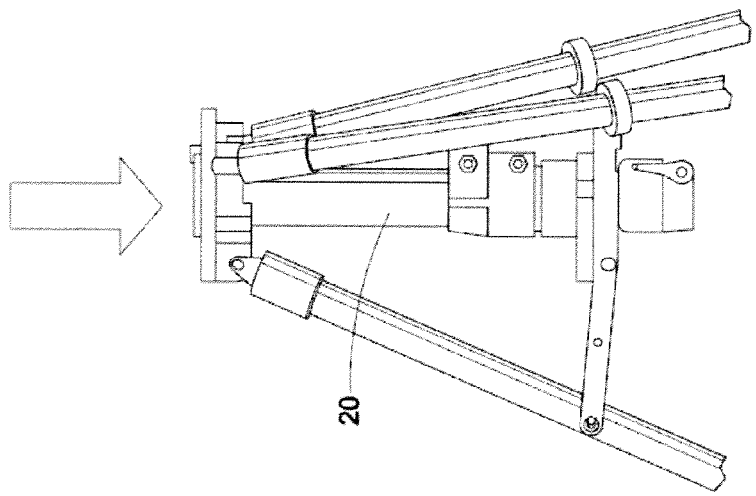
FIGS. 16 (a) and (b) shows the method of loading mast sections into the tripod for deployment of the mast.
Figure 16B:
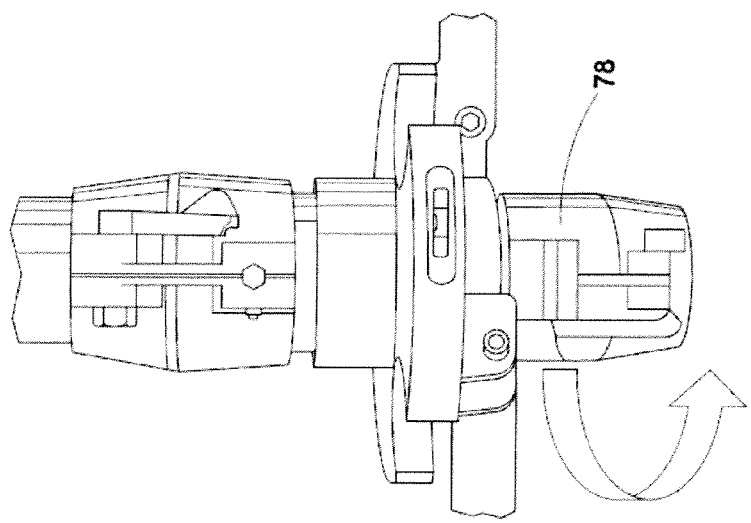

In the next step, the mast section 56 comprising the top mast section is added to the tripod as seen in FIGS. 16 and 17. To accomplish this, the lower clamp 78 is unlocked by moving the lock from the up position to the down position (FIG. 16(*a*)). The top mast section 80 is inserted from the top and secured in place at a comfortable working height, by locking the lower clamp 78 on the center tube 20 (FIG. 16(*b*)). The top mast section 80 can be easily identified as the shortest of all the mast sections 56. Only the top tube is inserted into the tripod from the top. The remaining mast sections are then individually breach loaded until the mast reaches its desired height.

As illustrated in FIGS. 17(*a*) and (*b*), a guy collar/top section adapter 82 and guy ropes (not shown) can then be attached to the top mast section 80 by unlocking the adapter and sliding the unlocked adapter 82 over the top end of the top mast section 80 (FIG. 17(*a*)). Once the adapter 82 is in place, the adapter is locked onto the top mast section 80 and the payload can optionally be secured to the adapter 82. The guy ropes are attached to the guy collar/top section adaptor 82 by latching carabiners of the guy line tensioner into the provided holes of the guy collar/top section adaptor 82. The guy line tensionsers should lay loose and pay off as the mast is raised. (not shown)

Figure 18A:
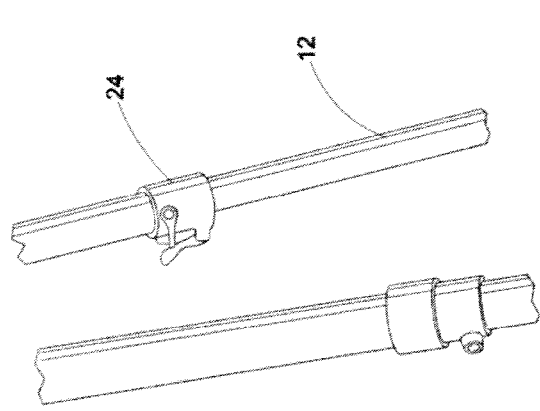
FIG. 18(a) shows a view similar to FIG. 2(a) of the locking mechanism located on the tripod legs.
Figure 18B:
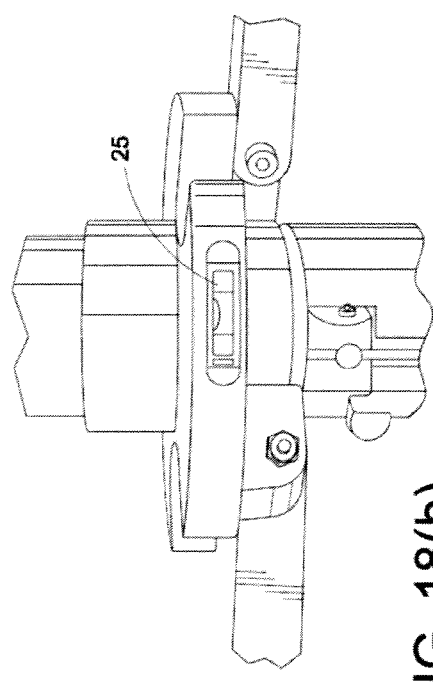
FIG. 18(b) is a front view of a tripod's bubble level(s)
Figure 19:
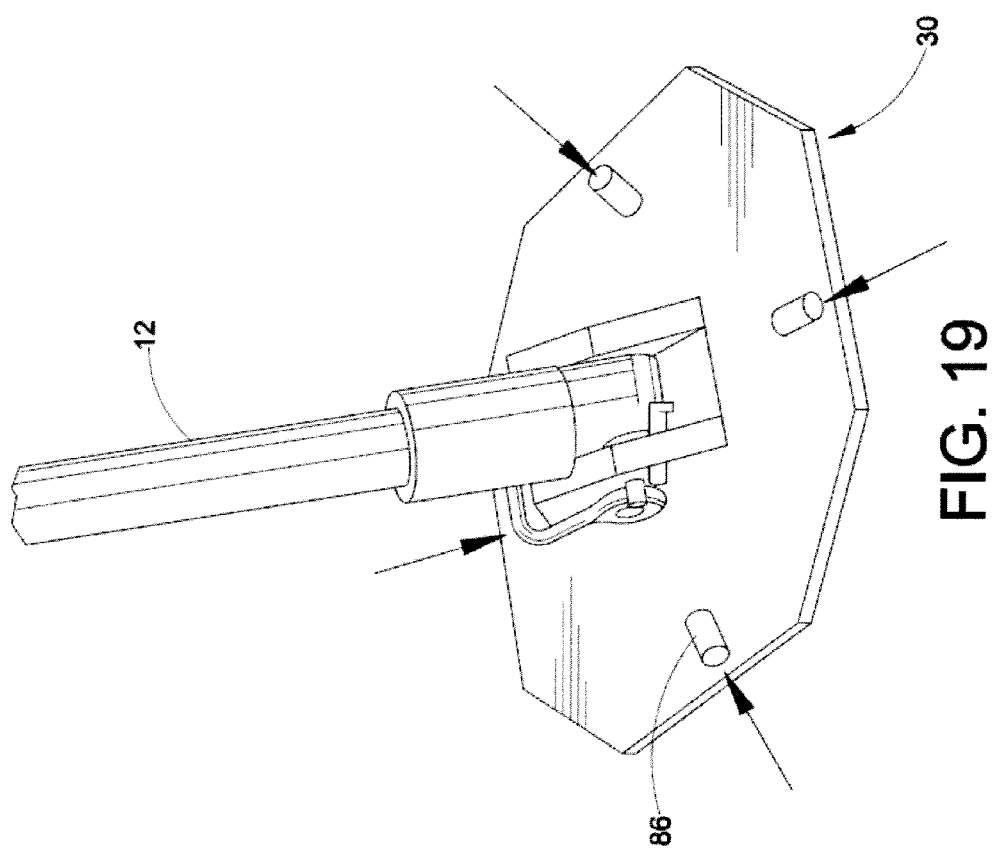
FIG. 19 illustrates a view similar to that of FIG. 14 including stake points for introducing ground stakes.

To extend and secure the tripod legs 12, the friction lock 24 of the legs is to be unlocked by opening a locking mechanism, which allows legs 12 to be extended to their full height potential, or any intermediate height therebetween. An exemplary embodiment of the friction lock 24 is depicted in FIG. 18(a). Once the legs 12 have been extended, they are locked in place by locking the friction lock 24, which is achieved by closing the locking mechanism. The tripod 10 should be raised high enough to permit the insertion of mast sections 56 through the lower clamp 78. To level the tripod, small adjustments can be made to the friction locks 24 until the bubble levels 25 on the collar assembly reads level, as depicted in FIG. 18(b). Once level, the base plates 30 can be staked by driving a ground stake (not shown) in any one of the four stake points 86 in the base plate 30 using a hammer and stakes provided with the transport pack. (See FIG. 19). The stakes should be hammered at an angle toward the center of the mast. Ground stakes should be always used to secure any mast system.

Figure 20:
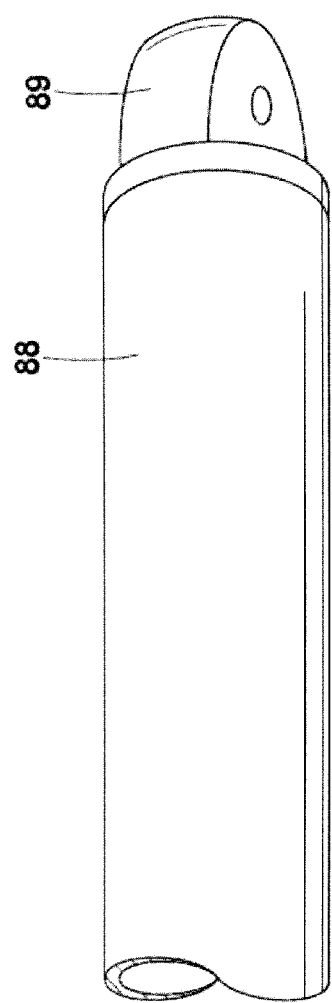
FIG. 20 is a side view of the bottom section with an adapter at one end.
Figure 21B:
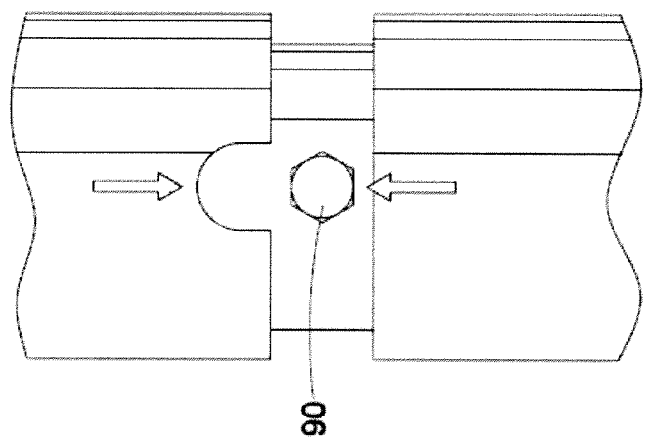
FIG. 21(b) is a side view key located on a mast section.
Figure 21A:
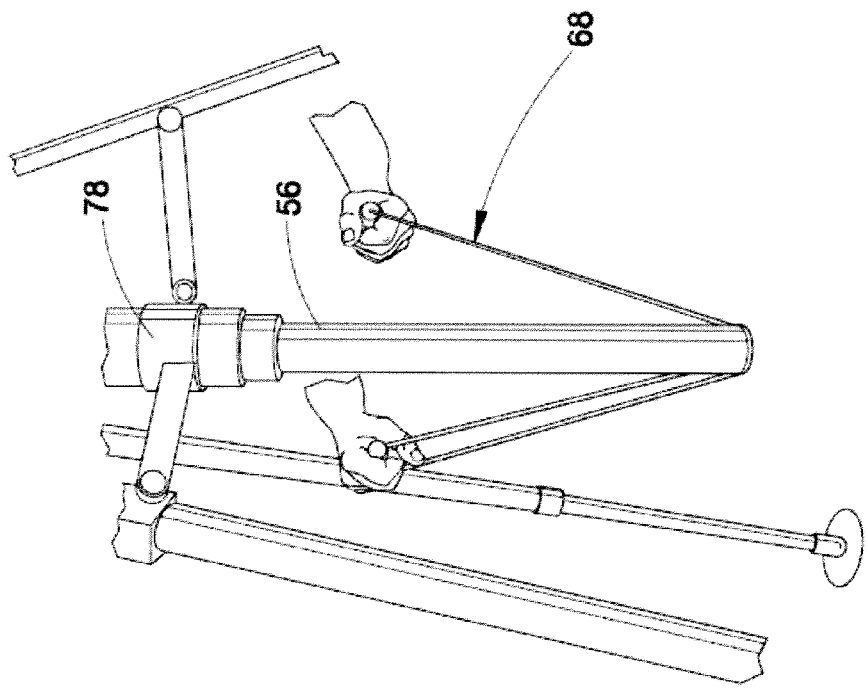
FIG. 21(a) is the ergonomic mast section lifter shown lifting a mast section.

Once the tripod is secure, the mast may then be extended to the desired height. To start, the base section 88 should be separated from the rest of the mast sections to ensure it is loaded last. The base section 88 is identifiable by the adapter 89 included on one end that includes a hole on one side, as illustrated in FIG. 20. The number of mast sections 56 needed to reach the desired working height are then individually breach loaded onto the tripod 10, as demonstrated in FIG. 21(a). The mast section 56 that is currently loaded in the tripod is first locked into place by the lower clamp 78 with the bottom keyway exposed under the lower clamp 78 of the tripod. It is important that each mast section 56 be securely locked into the lower clamp 78 after it is breach loaded. This lock bears the weight of the entire mast and payload and should to be secured to prevent the mast from retracting on its own. The next mast section to be loaded should be placed under the lower clamp 78 of the tripod (currently locked). The key 90 of the mast section 56 to be loaded is then aligned with the keyway of the mast section locked in the lower clamp 78. It is important to align the key 80 and keyway (FIG. 21(b)) properly in order to ensure proper deployment of the mast as well as prevent the keys 80 from being sheared under the weight of the mast and payload. The lower clamp 78 is then unlocked, which places all of the weight of the mast onto the section being loaded, and the mast section is breach loaded by 1) pushing up on it, or 2) pulling up on the provided loading puck 68, described above. This pushing or pulling action continues until the keyway of the mast section is just below the lower clamp 78 of the tripod 10. This step may then be repeated for each mast section to be added to the mast until the mast reaches its desired height.

The base section 88 may then be added to the tripod once the mast is extended to the desired height. The base section 88 should be loaded into the tripod 10 in order to provide additional support and bear the main load of the mast and/or payload. A base plate 30 is attached to the base section 88 and secured using a hitch pin on the base plate 30. The base section is then breach loaded into the tripod being mindful that the key of the base section aligns with the slot of the mast section above. When properly mated, the base plate 30 of the base section 88 should be slightly off the ground. The lower clamp 78 is then unlocked and the base plate 30 may be eased to the ground, ensuring that the base plate 30 sits firmly on the ground as is stable. The lower clamp 78 should stay unlocked to ensure the full weight of the mast and payload rests on the base section.

To stalk the guy ropes, preferably about four guy stakes and a hammer are removed from the transport pack, although more or less guy stakes can alternatively be used. Directionally, the guy stakes are aligned to coincide with the four holes located in the guy collar/top tube adapter 82. The stakes should be approximately 90 degrees apart from one another. The guy stakes should be optimally placed a distance ⅔ the height of the mast from the base of the tripod away from the tripod mast configuration. Table 1 depicts exemplary mast heights and recommended distance of guy stakes. Each stake should be driven into the ground at a 45° angle away from the tripod. The stake is driven into the ground up to the ring of the stake, with the ring facing the tripod.

TABLE 1

| Height of Mast (Ft.) | Location of Guy Stakes from Base of Tripod (Ft.) |
| --- | --- |
| 9 | 9 |
| 12 | 12 |
| 15 | 15 |
| 18 | 18 |
| 21 | 21 |
| 24 | 24 |
| 27 | 27 |
| 30 | 30 |
| 33 | 33 |
| 36 | 36 |
| 39 | 39 |
| 42 | 42 |
| 45 | 45 |
| 48 | 48 |
| 51 | 51 |
| 54 | 54 |
| 57 | 57 |
| 60 | 60 |

Figure 22A:
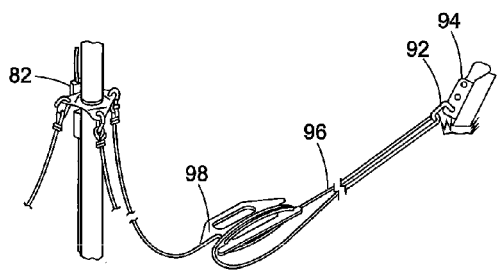
FIG. 22 (a)-(c) depicts the tensioning process of the guy lines according to one aspect of the present invention.
Figure 22B:
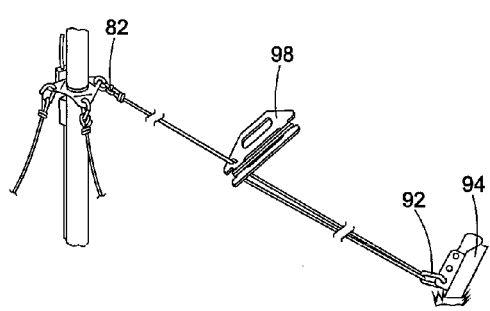
Figure 22C:
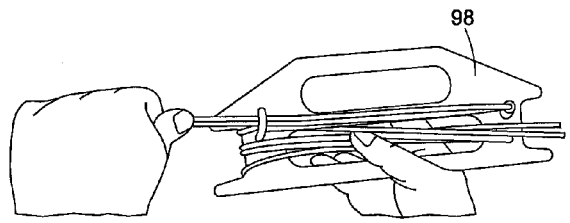

Next, the guy lines 96 are tightened to stabilize the mast, reduce masthead sway, and provide stability during wind loading, as illustrated in FIGS. 22(a)-(c). The lines 96 should not be over-tightened, because over-tightening will increase the downward load on the mast and the overall load capacity is reduced, which can lead to mast instability. The carabiner 92 of each of the tensioners 98 is attached to the ring of the guy stake, ensuring that the guy line attached to the guy stake coincides with the aligned hole in the guy collar/top tube adapter 82. It is important that none of the guy lines are crossed or intersect. To tighten the lines, the tensioners 98 are slid toward the mast and locked in placed by placing the guy tensioner hook over the double guy lines (See FIGS. 22(b) and (c)). The mast sections 56 should remain straight and perpendicular as the guy ropes are tightened. To loosen the ropes, the tensioner 98 is slid away from the mast.

According to one embodiment, the tripod mast assembly disclosed herein can further be dismantled quickly and easily by as little as a one or two man team. To dismantle the mast, the guy lines 96 should be loosened to relieve any tension or binding that may exist between the mast sections 56 Next, the lock of the lower clamp 78 should be disengaged and clamp the base section 88 lifted up to a level such that it is capable of being removed. The lower clamp 78 of the tripod should then be locked onto the next section of the mast, such that the base section of the mast can be removed. While holding this exposed section of the mast now locked into the lower clamp 78, the lock of the lower clamp is disengaged and the mast section is eased down to where the section is completely free of the lower clamp and the next section enters the lower clamp and has a small portion of the next mast section enter the lower clamp, with a small portion of the section exposed under the lower collar 76. The lower clamp is then once again locked onto this new mast section and the free section can be removed from under the tripod 10. This process of lowering and locking the mast sections should be repeated until all the mast sections 56 have been removed, except for the top mast section. The mast sections should be packed into the corresponding individual pockets of the transport pack.

Next, the ground stakes can be removed from the tripod base plates 30 and secured to the appropriate place on the transport pack. The locking mechanisms of the tripod legs are then unlocked, and the legs 12 are allowed to nest within themselves, which will bring the mast to a more manageable working height. The carabiners 92 of the guy lines are removed from the guy collar/top section adapter and disconnected from the ground stakes. The guy lines are then wrapped around the tensioners 98 and the guy line tensioners are packed into the transport pack along with the ground stakes. The guy collar/top section adapter is then removed from the top mast section and returned, along with the top section, to the transport pack. The lock located on the lower collar 76 may then be unlocked and the tripod 10 collapsed. Finally, the base plates are removed from the tripod and the tripod and base plates are returned to the transport pack. Once all the contents of the transport pack are in place, the snap clips should be tightened, ensuring the safe, effective, transportation of the tripod mast system.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A portable tripod mast assembly comprising:
    a tripod having at least three telescoping legs, each leg moveably attached to a common upper collar;
    a plurality of mast sections, adapted to fit together end to end, forming a mast; and
    a transport pack having a center compartment adapted to receive said tripod, the center compartment comprising a center panel and two side panels;
    wherein each side panel includes a plurality of individual vertical pockets for receiving said mast sections, said transport pack further including a base portion and a hood capable of extending over said mast sections, securing said sections in said pockets; and
    wherein the tripod is received in the center compartment with a first and second telescoping leg adjacent the center panel, and a third telescoping leg spaced from the center panel, at least one of the plurality of mast sections is received in each side pocket, and each side pocket is movable from a first position permitting access to the tripod to a second position trapping the tripod against the center panel whereat the at least one telescoping mast section received in each side pocket is positioned respectively between the first and second telescoping leg and the third telescoping leg.

2. The tripod mast assembly according to claim 1, wherein said tripod comprises a lightweight, glass-fiber composite material.

3. The tripod mast assembly according to claim 1, wherein said upper collar includes at least one of a raised boss and an anti-rotation boss.

4. The tripod mast assembly according to claim 1, wherein said plurality of mast sections comprise high strength carbon fiber.

5. The tripod mast assembly according to claim 1, wherein said mast is capable of extending to heights between about 9 and 60 feet.

6. The tripod mast assembly according to claim 1, wherein said transport pack is capable of accommodating each component of said tripod mast assembly for transport by a single person.

7. The tripod mast assembly according to claim 1, wherein said transport pack includes at least one adjustable shoulder strap, at least one chest adjustable strap and at least one adjustable waist strap on each side of said pack, capable of snapping together around a user's waist by a snap clip.

8. The tripod mast assembly according to claim 7, wherein each strap includes multiple strap adjustments for ergonomic fit to all body types.

9. The tripod mast assembly according to claim 1, wherein said base portion includes a padded, foldable bottom panel and a front panel connected thereto.

10. The tripod mast assembly according to claim 9, wherein the front panel folds up over the side panels and snaps into corresponding snap clips located on said hood.

11. The tripod mast assembly according to claim 10, wherein said font panel includes a main pocket.

12. The tripod mast assembly according to claim 11, wherein said main pocket includes attachments for securing tripod base plates.

13. The tripod mast assembly according to claim 1, wherein said hood includes a pouch, such that said tripod legs are capable of tucking into said pouch, securing said legs in the hood.

14. The tripod mast assembly according to claim 1, wherein said tripod is secured into said center compartment with at least one snap clip.

15. A method for transporting a tripod and mast assembly, said method comprising:
    providing a transport pack having a base portion, a hood, and a center compartment, said compartment consisting of a center panel and two side panels, each side panel comprising a plurality of individual pockets;
    positioning a tripod in said center compartment with a first and second telescoping leg of the tripod adjacent the center panel, and a third telescoping leg of the tripod spaced from the center panel and securing said tripod with at least one snap-clip;
    inserting a plurality of mast tube sections into said plurality of individual pockets in said side panels;
    closing said side panels over said center panel, such that the side panels enclose said tripod trapping the tripod against the center panel whereat the plurality of mast tube sections received in each of said pockets of said side panels are positioned respectively between the first and second telescoping leg and the third telescoping leg;
    extending said hood over said mast tube sections;
    unfolding said base portion into a bottom panel and a front panel, wherein said front panel extends over said side panels; and
    securing said hood to said front panel.

16. The method of transporting a tripod mast assembly according to claim 15, further including transporting the packed transport pack to a desired location and deploying said tripod mast assembly.

17. The method of transporting a tripod mast assembly according to claim 16, wherein said tripod mast assembly may be packed, transported and deployed by a single user.

\* \* \* \* \*